US012243696B2

(12) United States Patent
Furrer et al.

(10) Patent No.: US 12,243,696 B2
(45) Date of Patent: Mar. 4, 2025

(54) SYSTEM AND A METHOD FOR ADJUSTING A LENGTH OF AN INSULATING ROD FOR A HIGH VOLTAGE CIRCUIT BREAKER AND A HIGH VOLTAGE CIRCUIT BREAKER

(71) Applicant: Hitachi Energy Ltd, Zürich (CH)

(72) Inventors: Nils Henrik Furrer, Malmö (SE); Guenter Steding, Lottstetten (DE)

(73) Assignee: HITACHI ENERGY LTD, Zurich (CH)

( * ) Notice: Subject to any disclaimer, the term of this patent is extended or adjusted under 35 U.S.C. 154(b) by 0 days.

(21) Appl. No.: 18/292,167

(22) PCT Filed: Jul. 5, 2022

(86) PCT No.: PCT/EP2022/068590

§ 371 (c)(1),
(2) Date: Jan. 25, 2024

(87) PCT Pub. No.: WO2023/011822

PCT Pub. Date: Feb. 9, 2023

(65) Prior Publication Data

US 2024/0266128 A1 Aug. 8, 2024

(30) Foreign Application Priority Data

Aug. 2, 2021 (EP) .................................... 21189177

(51) Int. Cl.
*H01H 33/42* (2006.01)
*H01H 3/32* (2006.01)
*H01H 33/666* (2006.01)

(52) U.S. Cl.
CPC ....... *H01H 33/42* (2013.01); *H01H 2003/323* (2013.01); *H01H 2033/426* (2013.01); *H01H 2033/6667* (2013.01)

(58) Field of Classification Search
CPC ............ H01H 33/42; H01H 2033/426; H01H 2033/6667; H01H 2003/323; H01H 2033/66253; H01H 2033/66246
(Continued)

(56) References Cited

U.S. PATENT DOCUMENTS 4,152,561 A * 5/1979 Maier .................... H01H 71/70 200/400
5,004,877 A * 4/1991 Yin .................. H01H 33/66238 218/123

(Continued)

FOREIGN PATENT DOCUMENTS

CN 1260577 A 7/2000
DE 4226772 A1 2/1994

(Continued)

OTHER PUBLICATIONS

English Translation of Chinese Office Action, Chinese Application No. 202280054170.0, mailed May 7, 2024, 4 pages.

(Continued)

*Primary Examiner* — William A Bolton
(74) *Attorney, Agent, or Firm* — Sage Patent Group

(57) ABSTRACT

A system for adjusting a length of an insulating rod of a high voltage circuit breaker includes a clutch and a fitting. The clutch includes a thread with a given thread pitch, and the fitting includes a thread with a given thread pitch formed in coordination with the thread of the clutch. The fitting is adjustably coupled with the clutch by means of the threads and the fitting is configured to be fixedly coupled with the insulating rod such that with respect to an assembled state of the system with insulating rod and with respect to a longitudinal axis the length of the insulating rod is adjustable due to rotation of the clutch relative to the fitting.

10 Claims, 7 Drawing Sheets

(58) Field of Classification Search
USPC ............................................ 218/1; 200/400
See application file for complete search history.

(56) References Cited

U.S. PATENT DOCUMENTS

| | | | | | |
|---|---|---|---|---|---|
| 5,543,598 | A * | 8/1996 | Duffour | ........... | H01H 33/66238 218/138 |
| 9,552,946 | B2 * | 1/2017 | Ryu | ................. | H01H 33/66207 |
| 10,553,377 | B2 * | 2/2020 | Binner | ................. | H01H 33/666 |
| 2020/0365343 | A1 * | 11/2020 | Hartung | ............... | H01H 33/664 |
| 2020/0388455 | A1 * | 12/2020 | Ehrlich | ............ | H01H 33/66238 |

FOREIGN PATENT DOCUMENTS

| | | | |
|---|---|---|---|
| DE | 29823220 | U1 | 3/1999 |
| DE | 19959782 | A1 | 6/2000 |
| DE | 102006013444 | A1 | 9/2007 |
| DE | 102016002261 | A1 | 8/2017 |
| EP | 1843365 | A2 | 10/2007 |
| GB | 528978 | A | 11/1940 |
| JP | H08-252802 | A | 10/1996 |

OTHER PUBLICATIONS

International Preliminary Report on Patentability, International Application No. PCT/EP2022/068590, mailed May 3, 2023, 18 pages.
International Search Report and Written Opinion, International Application No. PCT/EP2022/068590, mailed Oct. 11, 2022, 14 pages.
Japanese Office Action and English Translation, Japanese Patent Application No. 2024-506507, mailed Jul. 2, 2024, 8 pages.

* cited by examiner

SYSTEM AND A METHOD FOR ADJUSTING A LENGTH OF AN INSULATING ROD FOR A HIGH VOLTAGE CIRCUIT BREAKER AND A HIGH VOLTAGE CIRCUIT BREAKER

CROSS REFERENCE TO RELATED APPLICATIONS

This application is a 35 U.S.C. § 371 national stage application of PCT International Application No. PCT/EP2022/068590 filed on Jul. 5, 2022, which in turn claims priority to European Patent Application No. 21189177.5, filed on Aug. 2, 2021, the disclosures and content of which are incorporated by reference herein in their entireties.

TECHNICAL FIELD

The present disclosure relates to a system and a method for adjusting a length of an insulating rod for a high voltage circuit breaker. The present disclosure is further related to a corresponding high voltage circuit breaker.

BACKGROUND

Circuit breakers are automatically operated electrical switches designed to protect an electrical circuit from damage caused by excess current from an overload or short circuit, for example. Accordingly, a high voltage circuit breaker is a security switch or switchgear configured to act in the high voltage range of 10 kV or more, for example. Document EP 1 843 365 A2 discloses an actuating rod assembly comprising a control rod and a holder fitting at a control rod end. The holder fitting exhibits a hollow cylindrical recess with an inner superficies surface and an outer superficies surface. The inner superficies surface is formed by a holder fitting unit and the outer superficies surface is formed by a holder fitting unit. In this respect, it is a challenge to provide a stable and reliable circuit breaker for high voltage applications.

SUMMARY

Embodiments of the present disclosure relate to a system for adjusting a length of an insulating rod for a high voltage circuit breaker. Further embodiments of the present disclosure relate to a corresponding high voltage circuit breaker including such a system. Further embodiments of the present disclosure relate to a method for adjusting a length of an insulating rod for a high voltage circuit breaker.

According to an embodiment, a system for adjusting a length of an insulating rod of a high voltage circuit breaker comprises a clutch and a fitting. The clutch is configured to couple the insulating rod with a lever of the high voltage circuit breaker to transmit an acting movement causing separation of electrical contacts of the high voltage circuit breaker. The clutch includes a thread with a given thread pitch. The fitting also comprises a thread with a given thread pitch formed in coordination with the thread of the clutch. The fitting and the clutch are adjustably coupled with each other by means of their threads. The fitting is configured to be fixedly coupled with the insulating rod such that with respect to an assembled state of the system with the insulating rod and with respect to a longitudinal axis the length of the insulating rod is adjustable due to rotation of the clutch relative to the fitting by means of their threads.

Due to the described configuration of the system a secure and reliable length adjustment of the insulating rod of a high voltage circuit breaker is feasible at low cost. The clutch comprises a coupling section for connection with a lever mechanism of the circuit breaker and an adjustment section including the thread for adjusting an effective length of the insulating rod. The coupling section and the adjustment section are formed in one piece, for example. The fitting also comprises a coupling section for connection with the insulating rod of the circuit breaker and an adjustment section including the thread for adjusting the effective length of the insulating rod in interaction with the clutch. The fitting can also be formed in one piece, for example. Thus, the system is feasible with clear structure at low cost and forms an intermediate module between the lever mechanism and the insulating rod of the high voltage circuit breaker.

It is a recognition of the present disclosure that the performance of a high voltage circuit breaker depends on travel characteristics of arcing and nominal contacts. A timing and a point of contact separation is of paramount importance for the circuit breaker's capability to interrupt the associated electrical circuit. The timing is mainly influenced by the travel characteristic of a drive and a linkage. Manufacturing tolerances are a major contributor to the inaccuracies of the linkage. In order to eliminate the influence of the assembly and manufacturing tolerances, the length of the insulating rod can be adjusted during the assembly process by rotating the clutch relative to the fitting.

By use of the system it is possible to ensure a correct timing of the electrical contact separation, despite manufacturing tolerances of interrupter parts. The system contributes to simplify adjustment of the length of the insulating rod and thus to compensate for manufacturing and assembly tolerances to a defined value.

According to an embodiment the fitting is shaped as a sleeve and its thread is formed as an internal thread on an inside of the fitting. The thread of the clutch is formed as an external thread on an outside of the clutch such that with respect to an assembled state of the system the clutch extends into the sleeve-shaped fitting. Such a configuration enables a secure and reliable length adjustment only by use the fine threads of the clutch and the fitting.

For example, the threads of the clutch and the fitting are formed in coordination with each other and comprise given thread pitches such that a rotation of the clutch by 180° relative to the fitting around the longitudinal axis causes a change of the length of the insulating rod of 0.5 mm. According to further embodiments, the thread pitches can be formed alternatively to enable ever more precise adjustments or a coarser settings of the length of the insulating rod. In particular a rotation of the clutch by 180° relative to the fitting around the longitudinal axis causes a change of the length of the insulating rod by half of the thread pitches. In context with this description, the described length of the insulating rod does not relate to the original fix length of the formed insulating rod element but the effective length of the original length of the insulating rod in sum with the adjustable length provided by the clutch and the fitting and their engaged threads.

According to a further embodiment, the system comprises a securing member that is coupled with the clutch configured to counteract an unwanted rotation of the clutch relative to the fitting. For example, the securing member is formed as a locking pin or bolt. In this respect, the fitting and the clutch each comprises a securing opening and the locking pin is inserted into these securing openings after length adjustment to counteract a further rotation of the clutch. Alternatively or additionally the securing member can comprise a nut to fix the adjusted clutch. The nut can further enable to beneficially preload the threads of the clutch and the fitting. However, there is no need for a complex assembly using a lot of elements to adjust the length of the insulating rod during assembly. Moreover, there is no need for an additional adhesive to fix the adjusted position of the clutch relative to the fitting.

In view of conventional designs the described system does not require a torque application and a usage of an adhesive to secure the adjustable elements. On the one hand, the application of torque at the clutches of the insulating rod increases the risk of mechanical failures due to overloading adjacent parts. On the other hand, there is a decisive risk that an applied adhesive does not cure properly, thereby loosening the adjusted connection. The adhesive carries a risk that it is dirty and/or greasy and thus it does not dry out reliably.

Thus, using the described system a risk for assembly errors is reduced as well due to its clear structure. The system provides a convenient and secure way of adjusting the length of the insulating rod during assembly and the adjustment does not require any tools to be carried out.

According to a further embodiment the fixed position of the clutch relative to the fitting can be further secured in place by means of a fixation element. Such a fixation element can be formed as a spring clip configured to fix the position of securing member with respect to an assembled and adjusted state of the system and the insulating rod.

According to a further embodiment of the system, the clutch is shaped as a sleeve in a region of its thread limiting an inner relief recess. Such a consciously formed opening can contribute to an improved force and tension distribution. The relief recess can completely penetrate the clutch along the longitudinal axis, for example. Alternatively, the relief recess is formed into the adjustment section of the clutch with a given depth. The shape of the relief recess can be a cone tapering in direction towards the coupling section. Alternatively, with respect to the longitudinal axis the relief recess is cylindrically limited by a surrounding wall of the clutch supporting the thread.

The longitudinal axis basically represents a symmetrical axis of the clutch, the fitting and the insulating rod. Thus, according to an assembled state, the fitting is arranged between the clutch and the insulating rod along the longitudinal axis. The longitudinal axis can also represent the axis of rotation of the clutch relative to the fitting.

The clutch is made from steel, for example. The insulating rod can also be made from steel. The fitting is made from aluminum, for example, and fixedly glued to the insulating rod.

According to a further embodiment of the system, the fitting comprises a support section limiting a support recess facing towards the clutch. The clutch comprises a shoulder section adjacent to its adjustments section with its thread. The support section of the fitting and the shoulder section of the clutch are formed in coordination with each other such that a guided and supported coupling of the clutch and the fitting is set. The fitting can be realized as a sleeve or a tube comprising an opening facing the clutch. In the support section a wall of the fitting limits the support recess to guide the insertion of the clutch and to support it in its adjusted state in interaction with the shoulder section of the clutch. The support section is formed adjacent to the thread, for example. The support recess can be manufactured as a drilling forming a guide hole with sliding fit.

The threads of the clutch and the fitting can each comprise a length with respect to the longitudinal axis which is formed predetermined in dependence of a tensile strength of the fitting with respect to an assembled state of the fitting with insulating rod. Alternatively or additionally, the thread of the clutch comprises a diameter across the longitudinal axis which is formed predetermined in dependence of a material and/or a tensile strength of the fitting with respect to an assembled state of the fitting with insulating rod. The threads of the clutch and the fitting are formed as fine threads to enable precise adjustment and also a stable and reliable holding of the interacting clutch, fitting and insulating rod. Thus, the diameter and/or the length of the threads is formed as large and/or as long as possible to enable full support of acting forces.

According to an embodiment, a high voltage circuit breaker comprises an insulating rod that is configured to separate electrical contacts of the high voltage circuit breaker, and an embodiment of the aforementioned system for adjusting a length of the insulating rod. The system is directly or indirectly coupled with the insulating rod by means of the fitting. As a result of that the high voltage circuit breaker comprises an embodiment of the system, described features and characteristics of the system are also disclosed with respect to the high voltage circuit breaker and vice versa.

According to an embodiment, a method of adjusting a length of an insulating rod of a high voltage circuit breaker comprises providing the clutch and the fitting with respective threads and given thread pitches. The method further comprises coupling the fitting with the clutch by means of screwing using the threads such that the clutch is adjustably coupled with fitting. The method further comprises coupling the fitting fixedly with the insulating rod. The coupling of the fitting with the insulating rod can be done afterwards to the coupling of the clutch with the fitting or beforehand. The method further comprises rotating the clutch relative to the fitting with respect to a longitudinal axis and thereby adjusting the length of the insulating rod.

The described method enables simple and precise adjustment of the length of the insulating rod of a high voltage circuit breaker during assembly and contribute to a stable and reliable functioning of the circuit breaker. As a result of that the method corresponds to an adjustment process using an embodiment of the aforementioned system, described features and characteristics of the system are also disclosed with respect to the method and vice versa.

According to an embodiment of the method, the clutch and the fitting each comprises a securing opening and the method further comprises providing a securing member, for example formed as a locking pin. The method further comprises inserting the locking pin into the securing openings of the fitting and the clutch and thereby fixing the clutch rotationally relative to the fitting with respect to the longitudinal axis.

The present disclosure comprises several aspects, wherein every feature described with respect to one of the aspects is also disclosed herein with respect to the other aspect, even if the respective feature is not explicitly mentioned in the context of the specific aspect.

The described system, the described high voltage circuit breaker and the described method allow for reducing a risk of thread loosening during operation. There is no need for an additional fixing component such as an adhesive to establish a secure and stable hold. Moreover, the system enables to reduce a risk of overloading adjacent parts during assembly due to tightening torque. The clutch and the fitting are configured such that they are connectable by screwing and allow for precise adjustment due to their given thread pitch. There no special tools required to adjust the length of the insulating rod. In addition, a mechanical stability of the clutch assembled inside the support recess of the fitting can be enhanced significantly.

BRIEF DESCRIPTION OF THE DRAWINGS

Exemplary embodiments are explained in the following with the aid of schematic drawings and reference numbers. The figures show.

The accompanying figures are included to provide a further understanding. It is to be understood that the embodiments shown in the figures are illustrative representations and are not necessarily drawn to scale. Identical reference numbers designate elements or components with identical functions. In so far as elements or components correspond to one another in terms of their function in different figures, the description thereof is not repeated for each of the following figures. For the sake of clarity elements might not appear with corresponding reference symbols in all figures possibly.

DETAILED DESCRIPTION

Figure 1:
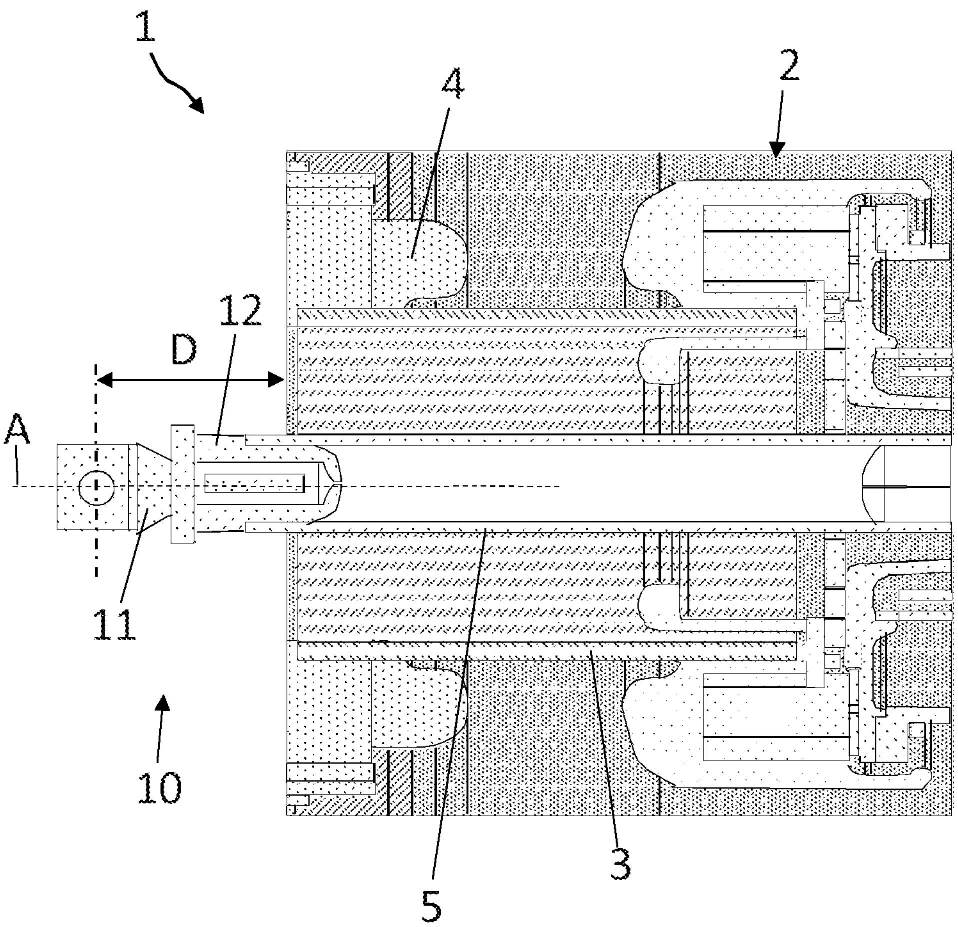
FIG. 1 an embodiment of a high voltage circuit breaker in a cross section side view, FIGS. 2-3 an embodiment of a system for adjusting a length of an insulating rod of the high voltage circuit breaker in a cross section side view, FIGS. 4-5 the system for adjusting the length of the insulating rod of the high voltage circuit breaker in perspective views, FIG. 6 a clutch of the system according to the FIGS. 1-5 in a perspective view, FIG. 7 a fitting of the system according to the FIGS. 1-5 in a perspective view, and FIG. 8 a flowchart for a method for adjusting the length of the insulating rod of the high voltage circuit breaker.

FIG. 1 illustrates an embodiment of a high voltage circuit breaker 1 in a cross section side view. The circuit breaker 1 realizes a security switch or switchgear configured to act in the high voltage range of 10 kV or more, for example.

The circuit breaker 1 comprises a system 10 which realizes an intermediate adjustment module between a lever mechanism and an insulating rod 5 of the circuit breaker 1 that is configured to separate electrical contacts of the circuit breaker 1 to protect an electrical circuit from damage caused by excess current from an overload or short circuit, for example. The insulating rod 5 is connected to moving contact parts inside the circuit breaker 1 and is supported by supporting parts 2, 3 and 4 which realize elements of a support insulator of the circuit breaker 1. The supporting part 2, 3 and 4 are configured to insulate the current carrying components of the interrupter or the circuit breaker 1 towards the ground.

Figure 2:
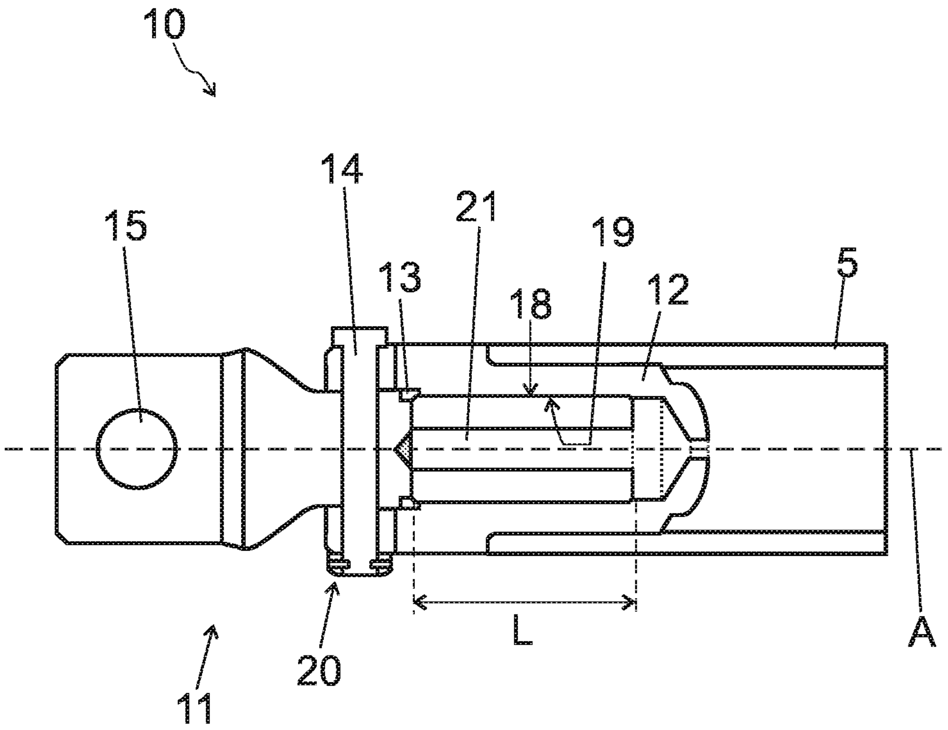
Figure 3:
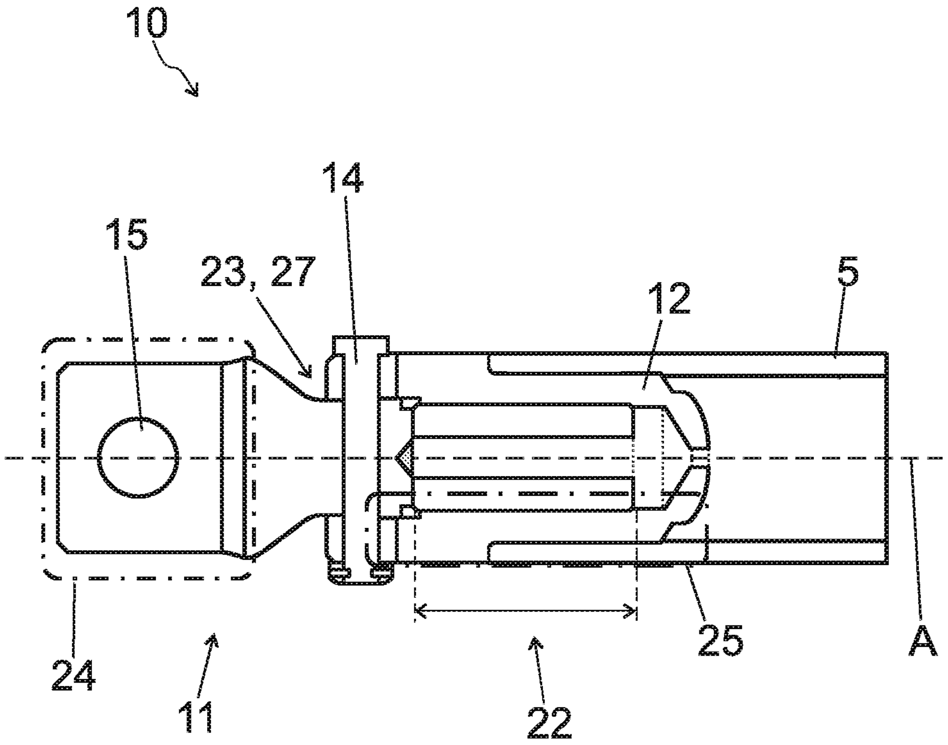
Figure 4:
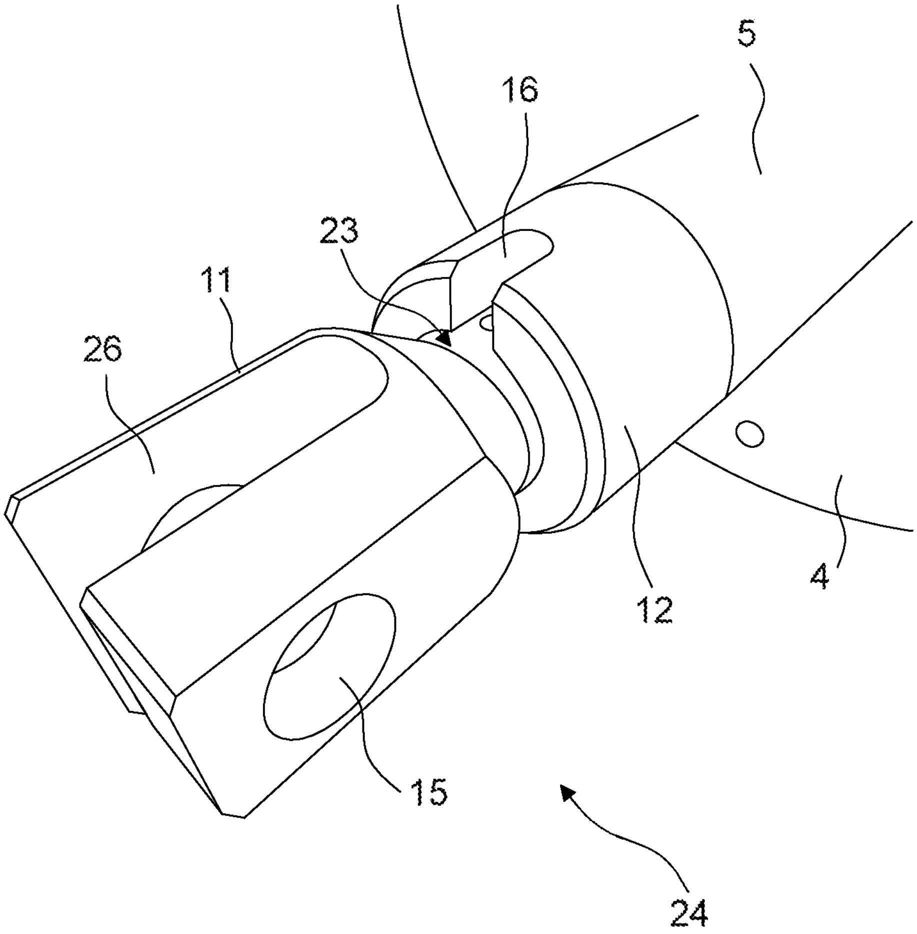
Figure 5:
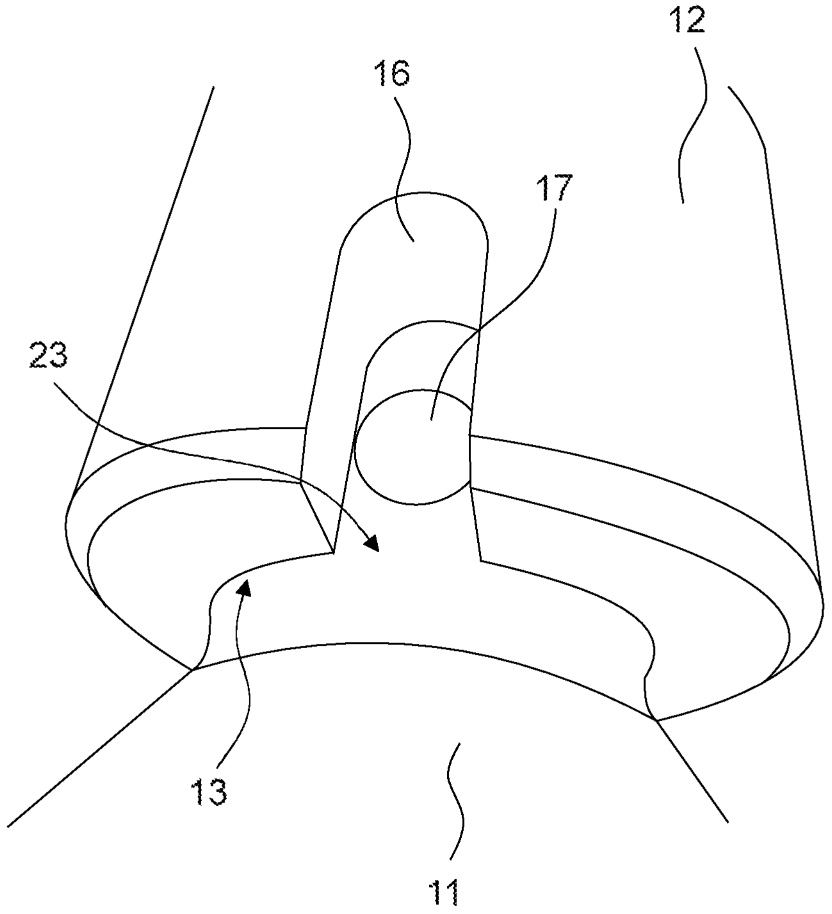
Figure 6:
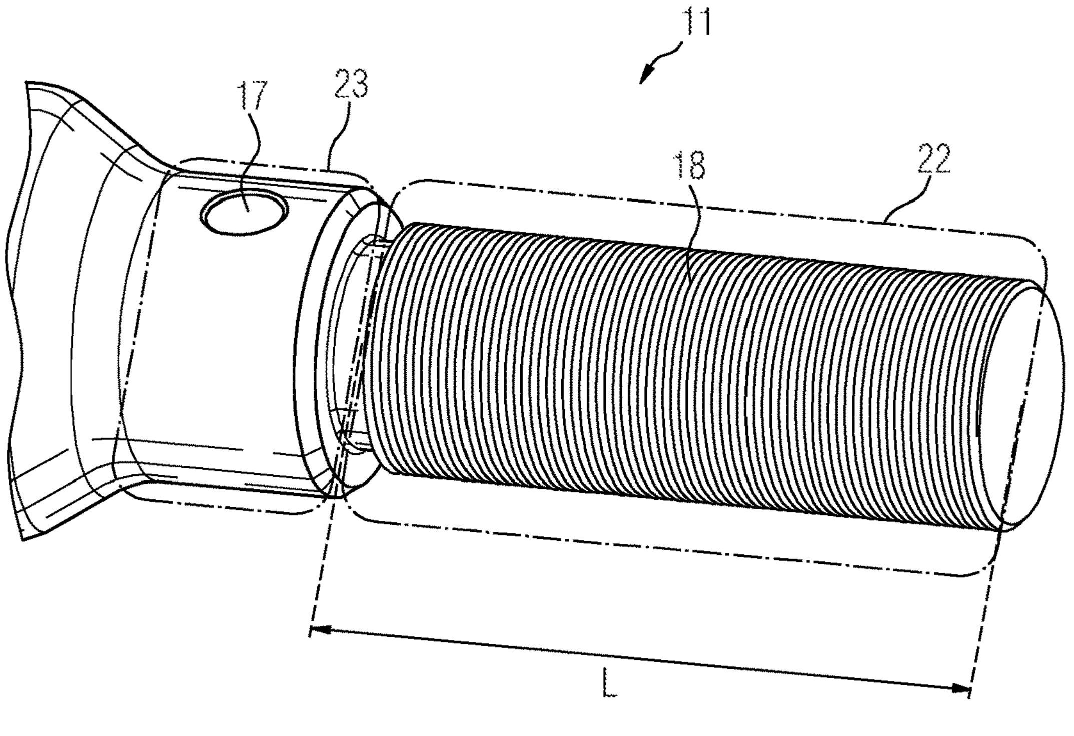
Figure 7:
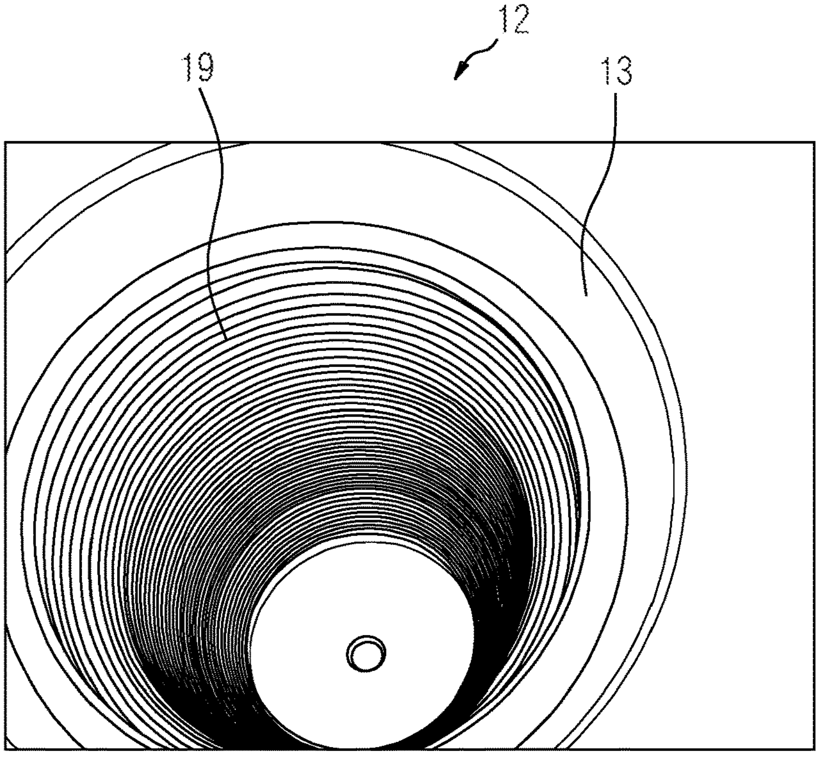
Figure 8:
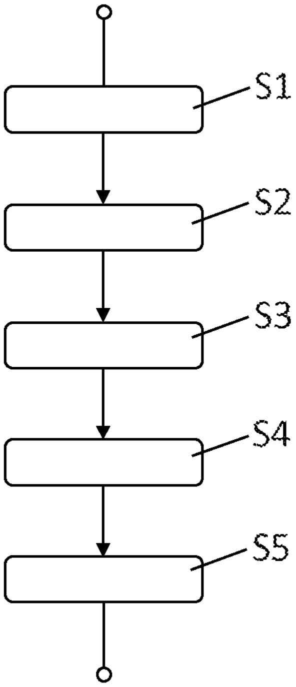

The FIGS. 2-3 show an embodiment of the system 10 for adjusting a length of the insulating rod 5 of the circuit breaker 1 in a cross section side view. The FIGS. 4-5 illustrate the system 10 in perspective views. FIG. 6 shows a clutch 11 of the system 10 in a perspective view, and FIG. 7 shows a fitting 12 of the system 10 in a perspective view. FIG. 8 illustrates a flowchart for a method for adjusting the length of the insulating rod 5 of the circuit breaker 1.

The clutch 11 is formed in one piece comprising a coupling section 24, a shoulder section 23 and an adjustment section 22 (see FIG. 3). The shoulder section 23 is formed between the coupling section 24 and the adjustment section 22 adjacent, respectively with respect to a longitudinal axis A of the clutch 11. The longitudinal axis A also represents a symmetrical axis of the clutch 11, the fitting 12 and the insulating rod 5.

The clutch 11 is configured to be coupled with the lever mechanism of the circuit breaker 1 to transmit an acting movement causing separation of electrical contacts of the circuit breaker 1. Therefore, the clutch 11 comprises a clutch opening 15 in the coupling section 24 which provides a coupling interface for a lever of the lever mechanism. The clutch 11 tapers in direction to the shoulder section 23. In the adjustment section 22 the clutch 11 comprises a thread 18 with a given thread pitch. The thread 18 is formed as an external thread on an outside of the adjustment section 22 facing the fitting 12 (see FIGS. 3 and 6).

The fitting 12 also comprises a thread 19 with a given thread pitch formed in coordination with the thread 18 of the clutch 11. The fitting 12 is sleeve-shaped and the thread 19 is formed as an internal thread on an inside of the fitting 12 facing the clutch 11 (see FIGS. 3 and 7). The fitting 12 is adjustably coupled with the clutch 11 by means of the threads 18, 19 (see FIGS. 2 and 3). The fitting 12 is fixedly coupled with the insulating rod 5, for example by means of an adhesive connection.

The fitting 12 is formed in one piece comprising a coupling section 25 and a support section 27 (see FIG. 3). The support section 27 is formed in coordination with the shoulder section 23 of the clutch 11 and enables a guided insertion of the clutch 11 and a stable hold in interaction with the shoulder section 23.

The fitting 12 is formed as a tube or a sleeve. The insulating rod 5 is configured as a tube or sleeve as well. The fitting 12 extends partially into the insulating rod 5 such that it is connected to the insulating rod 5 at an inside by means of press-fit and/or adhesive connection. In addition, the clutch 11 partially extends into the fitting 12 by means of supported fit in the support section 27 and the shoulder section 23 and by means of a non-positive fit and/or form-fitting due to the threads 18, 19.

The fitting 12 is arranged between the clutch 11 and the insulating rod 5 along the longitudinal axis A. The longitudinal axis A also represents an axis of rotation of the clutch 11 relative to the fitting 12. Thus, a precise adjustment of the length of the insulating rod 5 is enabled due to rotation of the clutch 11 relative to the fitting 12 by means of the interacting fine threads 18, 19.

An engaged thread length L can be adjusted by a given length of the adjustment section 22 which defines an adjustable distance D and an adjustment of the length of the insulating rod 5 (see FIGS. 3 and 6). The adjustable distance D is given by the distance between the clutch opening 15 of the clutch 11 and an outer side if the ring 4. The engaged thread length L is configured to be as long as possible, for example. A formation of the engaged thread length L depends on material characteristics of the fitting 12 and the clutch 11 and/or on a tension strength of the fitting 12 fixedly connected to the insulating rod 5. For example, the threads 18, 19 of the clutch 11 and the fitting 12 belong to a M26-screw size and thus comprise a diameter of 26 mm, the engaged thread length L should have a value of 2, 3 times the diameter of the threads 18, 19, hence 59.8 mm. Using such an engaged thread length L enables full force absorption or force distribution. However, shorter or larger length is possible as well to set a predetermined engaged thread length and the length of the insulating rod 5 depending on the intended application. A length of the threads 18 and 19 can be equal or different. Thus, the length of the external thread 18 of the clutch 11 can be shorter than the length of the internal thread 19 of the fitting 12.

The clutch 11 is shaped as a sleeve in a region of its thread 18 or the adjustment section 22 limiting an inner relief recess 21. Such a consciously formed opening can contribute to an improved force and tension distribution. The relief recess 21 penetrates the clutch 11 along the longitudinal axis A with a given depth and comprises a cylindrical shape or is cylindrically limited by a surrounding wall of the clutch 11 supporting the thread 18 at its outside surface.

The clutch 11 and the fitting 12 each comprises a securing opening 16, 17 formed to receive a securing member formed as a locking pin 14 (see FIGS. 3-6). With respect to an assembled and adjusted state of the system 10 and the insulating rod 5 the locking pin 14 extends into the securing openings 16, 17 to counteract an unwanted rotation of the clutch 11 relative to the fitting 12. The securing opening 16 of the fitting is formed as a long hole to provide an adjustable length and still enabling the locking pin 14 to extend through the fitting 12 and the clutch 11 at different length positions of the adjustable insulating rod 5.

The securing opening 16 of the fitting 12 can be formed as a long hole that is opened at one side as illustrated in the FIGS. 4 and 5. The securing opening 17 of the clutch 11 can be formed as a cylindrical hole matching the size of the locking pin 14 as illustrated in the FIGS. 2-3 and 5-6. Moreover, the clutch 11 can comprise a further clutch opening 26 formed as a long hole penetrating the clutch in the region of its coupling section 24 across its opening 15. The clutch opening 26 further enables stable connection with the lever mechanism of the circuit breaker 1.

In addition, the system 10 comprises a fixation element formed as a spring clip 20 which is configured to fix the position of the locking pin 14 with respect to an assembled state of the system 10 with insulating rod 5 and an adjusted length of the insulating rod 5.

According to FIG. 8 and the illustrated a flowchart the method for assembling and adjusting the length of the insulating rod 5 of the circuit breaker 1 can be processed as follows:

In a step S1 the clutch 11 and the fitting 12 are provided with their threads 18, 19 and associated thread pitches and with their respective openings 15, 16, 17, 26 and/or recesses 13, 21.

In a step S2 the fitting 12 fixedly with the insulating rod 5 by means of a press-fit and/or an adhesive connection, for example.

In a step S3 the clutch 11 is coupled with the fitting 12 by screwing in the clutch 11 into the fitting 12 until the shoulder section 23 of the clutch 11 is arranged in the supporting section 27 of the fitting 12. Thus, the fitting 12 and the clutch 11 are adjustably coupled with each other by means of the threads 18, 19.

In a step S4 the adjustment of the length of the insulating rod 5 can be performed. Thereby, the clutch 11 is rotated relative to the fitting 12 with respect to the longitudinal axis A until a desired effective length of the insulating rod 5, the fitting 12 and the clutch 11 is set.

In a further step S5 the locking pin 14 is provided and inserted into the securing openings 16, 17 of the fitting 12 and the clutch 11 in order to fix the rotatory adjusted position of the clutch 11 relative to the fitting 12.

Thus, the clutch 11 is secured in its position by the locking pin 14 which engages in the fitting 12. The locking pin 14 can be secured by the spring clip 20.

The length of the insulating rod 5 can be adjusted by turning the clutch 11 by 180°-steps. An adjustment increment is hereby defined by the thread pitch. In order to enhance a mechanical stability, the clutch 11 comprises the shoulder section 23 which is guided by the support recess 13 and the support section 27 of the fitting 12 to reduce a notch effect in case of bending moments or lateral forces. In addition, the relief recess 21 ensures continuous application of force from the threads 18, 19 to the clutch 11.

The embodiments shown in the FIGS. 1 to 8 as stated represent exemplary embodiments of the system 10 for adjusting the length of the insulating rod 5 of the high voltage circuit breaker 1. Therefore, they do not constitute a complete list of all embodiments. Actual arrangements may vary from the embodiments shown in the figures.

REFERENCE SIGNS

1 high voltage circuit breaker
2 flange
3 tube
4 ring
5 insulating rod
10 system
11 clutch
12 fitting
13 support recess
14 securing member/locking pin
15 clutch opening
16 securing opening of the fitting
17 securing opening of the clutch
18 external thread of the clutch
19 internal thread of the fitting
20 spring clip
21 relief recess
22 adjustment section of the clutch
23 shoulder section of the clutch
24 coupling section of the clutch
25 coupling section of the fitting
26 clutch opening
27 support section of the fitting
A longitudinal axis of the high voltage circuit breaker/of the clutch
D adjustable distance
L engaged thread length

The invention claimed is:

1. A system for adjusting a length of an insulating rod of a high voltage circuit breaker, comprising:

a clutch that is configured to couple the insulating rod with a lever of the high voltage circuit breaker to transmit an acting movement causing separation of electrical contacts of the high voltage circuit breaker, wherein the clutch includes a thread with a given thread pitch, a fitting that includes a thread with a given thread pitch formed in coordination with the thread of the clutch, wherein the fitting is adjustably coupled with the clutch by means of the threads and the fitting is configured to be fixedly coupled with the insulating rod such that with respect to an assembled state of the system with the insulating rod and with respect to a longitudinal axis the length of the insulating rod is adjustable due to rotation of the clutch relative to the fitting, and a securing member that is coupled with the clutch configured to counteract an unwanted rotation of the clutch relative to the fitting, wherein the fitting and the clutch each comprises a respective securing opening and wherein the securing member is formed as a locking pin which extends into the securing openings of the fitting and the clutch.

2. The system according to claim 1, wherein the fitting is shaped as a sleeve and the thread of the fitting is formed as an internal thread on an inside of the fitting, and wherein the thread of the clutch is formed as an external thread on an outside of the clutch and the clutch extends into the sleeve-shaped fitting.

3. The system according to claim 1, comprising:

a fixation element formed as a spring clip configured to fix a position of the securing member with respect to an assembled state of the system with insulating rod and an adjusted length of the insulating rod.

4. The system according to claim 1, wherein the clutch is shaped as a sleeve in a region of the thread of the clutch limiting an inner relief recess.

5. The system according to claim 1, wherein the fitting comprises a support section limiting a support recess facing towards the clutch, and wherein the clutch comprises a shoulder section adjacent to the thread of the clutch, the support section and the shoulder section are formed in coordination with each other such that a guided and supported coupling of the clutch and the fitting is set.

6. The system according to claim 1, wherein the thread of the clutch and the thread of the fitting each comprises a length with respect to the longitudinal axis which is formed predetermined in dependence of a tensile strength of the fitting with respect to an assembled state of the fitting with insulating rod.

7. The system according to claim 1, wherein the thread of the clutch comprises a diameter across the longitudinal axis which is formed predetermined in dependence of a material and/or a tensile strength of the fitting with respect to an assembled state of the fitting with insulating rod.

8. The system according to claim 1, wherein the thread of the clutch and the thread of the fitting are formed in coordination with each other, and the thread pitch of the thread of the fitting and the thread pitch of the thread of the clutch are given such that a rotation of the clutch by 180° relative to the fitting around the longitudinal axis causes a change of the length of the insulating rod by half the thread pitch of the thread of the clutch.

9. A high voltage circuit breaker, comprising:

an insulating rod that is configured to separate electrical contacts of the high voltage circuit breaker, and a system for adjusting a length of the insulating rod to claim 1, that is coupled with the insulating rod by means of the fitting.

10. A method of adjusting a length of an insulating rod of a high voltage circuit breaker, comprising:

providing a clutch that is configured to couple the insulating rod with a lever of the high voltage circuit breaker to transmit an acting movement causing separation of electrical contacts of the high voltage circuit breaker, wherein the clutch includes a thread with a given thread pitch, wherein the clutch comprises a securing opening, providing a fitting that includes a thread formed in coordination with the thread of the clutch, wherein the fitting comprises a securing opening, coupling the fitting with the clutch such that the clutch is adjustably coupled with the fitting by means of the thread of the clutch and the thread of the fitting, coupling the fitting fixedly with the insulating rod, rotating the clutch relative to the fitting with respect to a longitudinal axis and thereby adjusting the length of the insulating rod, providing a securing member formed as a locking pin, and inserting the locking pin into the securing opening of the fitting and the securing opening of the clutch and thereby fixing the clutch relative to the fitting with respect to a rotation around the longitudinal axis.

* * * * *